United States Patent [19]
Gardner

[11] 3,713,731
[45] Jan. 30, 1973

[54] TENSIONING DEVICE FOR EYEGLASS FRAMES

[76] Inventor: Irving Gardner, P.O. Box 294, Hunter, N.Y. 12442

[22] Filed: Aug. 5, 1971

[21] Appl. No.: 169,209

[52] U.S. Cl. .................................351/113, 351/121
[51] Int. Cl. ...........................................G02c 5/16
[58] Field of Search......351/111, 112, 113, 121, 154; 16/128 A; 267/36, 154

[56] References Cited

UNITED STATES PATENTS

| | | | |
|---|---|---|---|
| 3,654,376 | 4/1972 | Lyons | 351/121 |
| 2,087,502 | 7/1937 | Chylack | 351/113 |
| 1,572,733 | 2/1926 | McCourt | 351/113 |
| 2,756,632 | 7/1956 | Parsell | 351/121 |

FOREIGN PATENTS OR APPLICATIONS 805,453    5/1951    Germany..........................351/112

*Primary Examiner*—David Schonberg
*Assistant Examiner*—Robert L. Sherman
*Attorney*—Jacob B. Burke

[57] ABSTRACT

An eyeglass frame has tensioning means for hinged temples. The tensioning means includes a springy member secured to each of the temples. Each member has a cylindrical end edge bearing against an end of the eyeglass frame when the temples are in an open position, thereby exerting pressure thereon. The tensioning members can be adjusted by lateral adjusting screws set with the temples, to a position for the wearer's comfort, whereby a particular pre-set tension will be maintained. The tensioning members may have elongated extensions serving as spring clips.

4 Claims, 9 Drawing Figures

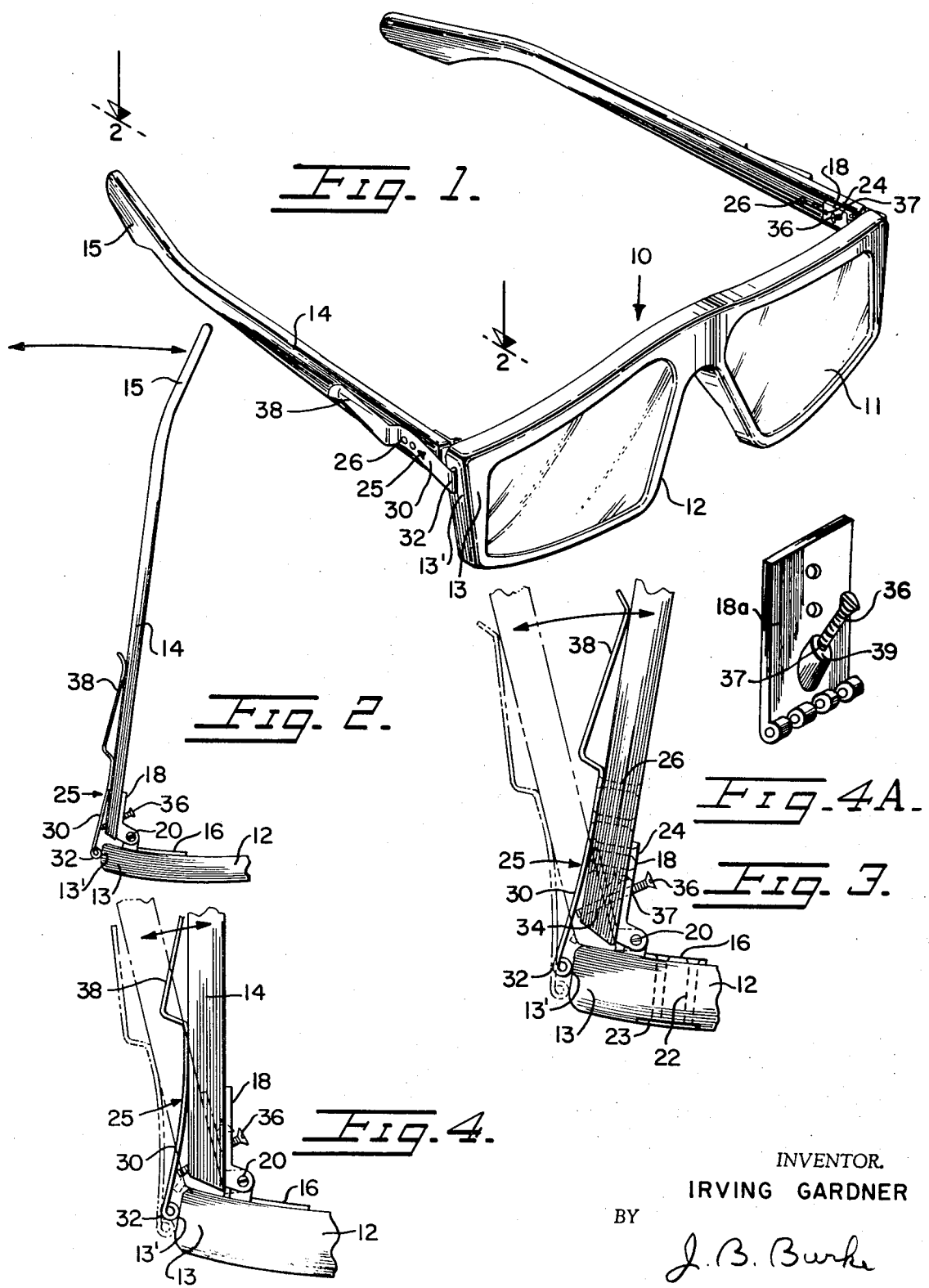

PATENTED JAN 30 1973
3,713,731
SHEET 2 OF 2
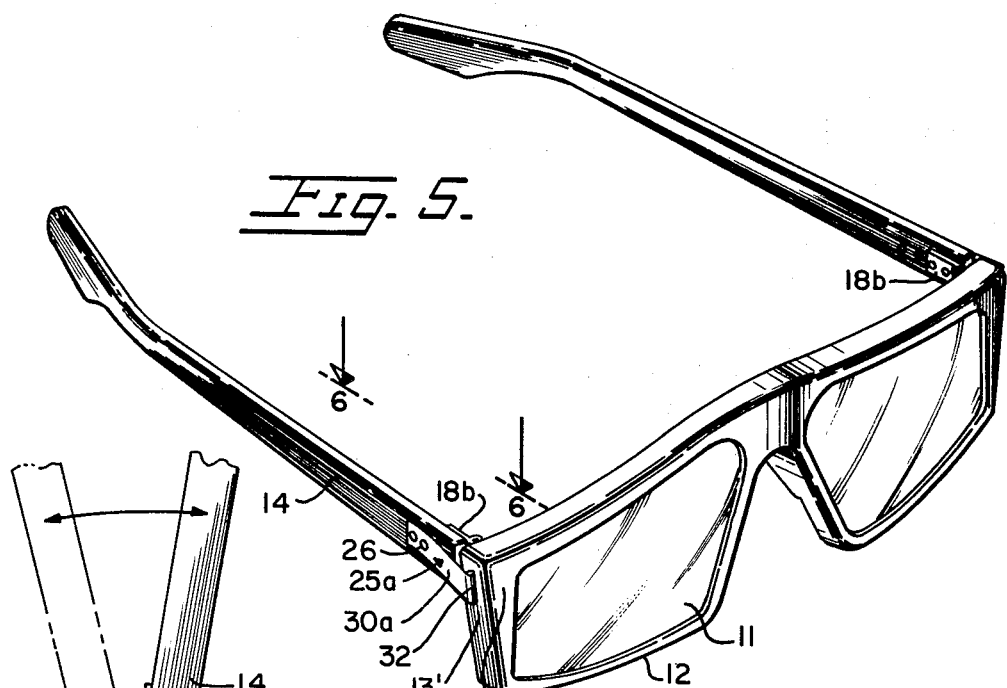
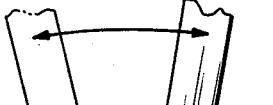
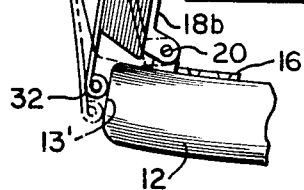
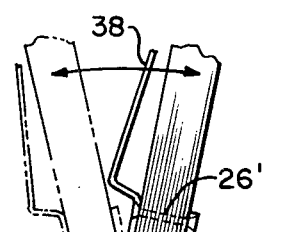
INVENTOR.
IRVING GARDNER
BY
*J. B. Burke*
ATTORNEY.

TENSIONING DEVICE FOR EYEGLASS FRAMES

This invention relates to eyeglass frames having temple tensioning means, and more particularly concerns an eyeglass frame having spring members with cylindrical ends which slide on and bear against a spectacle frame.

Plastic or metal temples of conventional eyeglass frames frequently become distorted or bent through constant use, particularly in taking the eyeglasses off, and putting them on, which requires opening the temples wider than the usual wearing position. They lose their tension against the sides of the wearer's head and behind the ears, so that the eyeglasses slip uncomfortably out of position. The use of separate detachable devices such as rubber washers and springs has been proposed in the past for exerting tension upon the hinged temples. These have had a number of disadvantages. Rubber washers tend to crush and lose elasticity, and become gummy and jam the hinges of the temples. Loose springs fall off or become stretched and inoperative. Other proposed tensioning devices are unsightly, require special tool or machinery for installation, or present other difficulties and disadvantages.

The present invention has as its principle object provision of an eyeglass frame with simple inexpensive tensioning members for yieldably tensioning hinged temples by exerting pressure on the hinged ends of the frame.

Another object of the invention is to provide an eyeglass frame with temple tensioning members which may be adjusted for varying the tension between the temple and hinged ends of the frame.

Still another object of the invention is to provide an eyeglass frame with tensioning members which will adjust the position of temples, exerting pressure on the sides of the wearer's head and providing a comfortable fit.

A further object of the invention is to provide an eyeglass frame with tensioning members which will preset the position of the temples, allowing a wearer to take off and put on the glasses, and have the temples return to comfortable fitting, wearing position.

According to the invention, a tensioning assembly (bar, plate, etc.) is secured to each temple of an eyeglass frame by rivets. The rivets may be the same ones that hold the hinge to the temple, providing their position is so located as to allow the bar a tensioning effect. The tensioning bar exerts pressure on the hinged end of the frame. A lateral adjustment screw may be provided for varying tension of the tensioning bar at the hinged ends of the temple and frame. The adjustment screw further provides for pre-setting the position of the temples. The bar may be provided with an extended spring arm which can serve as a spring clip for holding the eyeglasses in a folded position in a person's pocket.

Other and further features, objects and advantages of the invention will become apparent from the following detailed description taken together with the drawing wherein:

FIG. 1 is a perspective view of a pair of eyeglasses having temples carrying tensioning bars according to a first embodiment of the invention.

FIG. 2 is a fragmentary top plan view of one temple and end portion of the eyeglass frame taken on line 2—2 of FIG. 1.

FIG. 3 is an enlarged fragmentary top plan view of one temple and end portion of the eyeglass frame in an optimum open wearing position, the temple position when putting on eyeglasses being shown by phantom lines.

FIG. 4 is a further enlarged fragmentary top plan view of one temple and end portion of the eyeglass frame, showing the lateral screw adjustment and the effect of screw operation on the temple position.

FIG. 4A is a perspective view of a modified form of hinge plate illustrating a second embodiment of the invention.

FIG. 5 is a perspective view of a pair of eyeglasses having temples carrying tensioning bars without the lateral screw adjustment and without the spring clip, illustrating a third embodiment of the invention.

FIG. 6 is an enlarged fragmentary top plan view taken on line 6—6 of FIG. 5.

FIG. 7 is an enlarged fragmentary top plan view, similar to FIG. 3, showing the tensioning bar without spring clip, illustrating a fourth embodiment of the invention.

FIG. 8 is an enlarged fragmentary top plan view, similar to FIG. 4, without lateral screw adjustment, illustrating a fifth embodiment of the invention.

Referring first to FIGS. 1-4, there is shown a pair of spectacles or eyeglasses 10 having frontal lenses 11 mounted in a frame 12 peripherally enclosing the lenses, and having opposite end corners 13 carrying a pair of hinged temples 14. Each hinge 15 has two hinge plates 16, 18 pivotally attached by a hinge pin 20. Plate 16 is secured by rivets 22 extending into end corner 13 of the frame 12. Rivets 22 have a common front head 23. Hinge plate 18 is secured by rivets 24 extending through the front portion of the temple. Hinge plates 16 and/or heads 23 can be embedded in the body of the frame at corners 13 if desired. To the extent described, the eyeglass assembly is conventional.

Now according to the invention, there is provided a spring tensioning bar 26 made of metal, plastic or other suitable springy material, mounted on each temple 14. The bar has a rectangular front portion 30 secured at its rear end to the outerside of each temple at the front end thereof, by rivets 26. This bar provides effective spring tensioning. The front free end of the rectangular portion 30 has an inwardly rolled cylindrical integral portion 32 extending just beyond the front end of the temple and overlaying the outside lateral end surface 13' of frame corner 13, as clearly shown in FIGS. 1-4.

In the front end portion of each of temples 14 is an angular bore 34. Rotatably disposed in this bore is a set screw 36 threaded in a threaded hole 37 in hinge plate 18. Bore 34 extends entirely through the temple so that the outer end of screw 36 bears against the inner side of front portion 30 of bar 25 as clearly shown in FIGS. 2-4.

By the arrangement described, each temple when open as shown in FIGS. 1-4 is normally held in proper orthogonal i.e. perpendicular position with respect to frame 12, so that the inwardly turned rear end portions 15 of temples 14 grip the head of the wearer in comfortably fitting wearing position. The temples can be closed readily without interference by the tensioning bars. When the temples are closed the rolled cylindrical ends of the tensioning bars facilitate sliding the eyeglasses into a case or pocket. The cylindrical ends 32 are smooth and thus cannot catch on a garment or cut a person's fingers. They also perform the important function of sliding on the end of the eyeglass frame and bearing against it without scratching or cutting. When the temples are open, the eyeglasses are put in place by the wearer. The temples can be spread outward laterally at obtuse angles to the frame to the dotted line positions shown in FIGS. 3 and 4 to facilitate sliding the eyeglasses into place on the wearer's head. Tensioning bars 25 then yield by flexing rectangular portions 30 while the rolled cylindrical end portions 32 slide slightly forwardly on frame ends 13'. When the temples are in place on the wearer's head, the rolled ends of the tensioning bars press inwardly on the frame ends 12 holding the temples in place. This arrangement overcomes the looseness and slippage which develop in time when hinges 16, 18 wear at pins 20. The tensioning bars 25 may have rear bowed spring clip extensions 38. These can serve to hold the eyeglasses in place in a wearer's pocket and assist and cooperate with rivets 26 in holding the tensioning bar securely in place on the temple. Either one or both tensioning bars can be provided with a spring clip extension.

If desired there can be provided a threaded nipple 39 surrounding hole 37 and integral with hinge plate 18' as shown in FIG. 4A. This will help to grip the screw 36 more securely.

In the embodiment of FIGS. 6–8 now to be described, parts corresponding to those of FIGS. 1–4 are identically numbered. In FIGS. 5 and 6, tensioning bar 25a is cut short at the rear end of rectangular portion 30a, omitting spring clip 38. The adjustment screw 36 shown in FIGS. 1–4 is omitted from hinge plates 18b. This provides a simpler construction which may be desirable, even though it lacks adjustable features.

In the embodiment of FIG. 7, the construction is similar to those previously described. Adjustment screw 36 bears against rectangular portion 30a of tensioning bar 25a. The spring clip 38 of FIG. 1–4 is omitted. Hinge plate 18c is extended and rivets 26' secure both tensioning bar 25a and plate 18c to temple 14.

In the embodiment of FIG. 8, the adjustment screw is omitted from extended hinge plate 18d. Rivets 26' secure hinge plate 18d and tensioning bar 25 to temple 14. Spring clip 38 is provided on tensioning bar 25.

In all forms of the invention described, the eyeglasses have tensioning bars secured on temple members and provided with smooth, cylindrical free ends bearing on frame ends for holding the temples in tension against sides of the wearer's head. The tensioning bars shown and described are attractive in appearance and inexpensive to manufacture. They are easily installed on the temples at time of manufacture or while the hinge plates 18, 18a or 18b are being attached by rivets 26. The tensioning bars provide long, satisfactory, reliable service. The tensioning bars are safe since their rolled cylindrical ends cannot cut or tear fingers or garments.

While a limited number of embodiments of the invention have been described, it will be apparent that many modifications and variations are possible without departing from the scope of the invention as defined in the appended claims.

What is claimed is:

1. Eyeglasses, comprising:
    a substantially flat frame arranged for peripherally enclosing frontal lenses;
    a pair of substantially flat temple members;
    hinge members pivotally connecting front ends of the temple members to opposite ends of said frame, each of said hinge members comprising:
        a first flat hinge plate secured to an end of said frame,
        a second flat hinge plate mounted on an inner side of said temple member at its front end, and
        a hinge pin pivotally joining the hinge plates;
    temple tensioning means, comprising two springy bars each secured by fixed attachment means at one end thereof to outer sides of the temple members respectively at points spaced from front ends of the temple members so that other free ends of the bars are able to move toward and away from the temple members while the bars flex, each of said other free ends of the bars having an integral, smooth, rounded form and extending forwardly beyond the front end of each temple member for sliding and pressing against a lateral end surface of the frame when the temple members are hinged open between positions perpendicular to said frame and at obtuse angles to the frame,
    whereby the springy bars yieldably contact the frame ends in tension when the temple members are manually moved sufficiently outwardly apart from each other to facilitate putting on the eyeglasses, so that the springy bars hold the temple members in tension when the temple members are released to press against the sides of a wearer's head; and
    tension adjustment means, comprising:
        temple members, each having an angular bore spaced from its front end and extending transversely therethrough between inner and outer sides thereof and continuing through said second flat hinge plate, and
        a set screw turnably disposed in said bore, said screw having an inner end exposed at the inner side of said temple member to permit turning the screw, and having a free outer end bearing adjustably against the inner side of the spring tensioning bar at a point between opposite ends thereof for adjusting the tensional contact of the cylindrical free end of the springy bar with the adjacent lateral end of the frame at a selected open angular position of the temple member with respect to the frame.

2. Eyeglasses as defined in claim 1, further comprising a nipple integrally formed with each of the second plates at the inner side thereof for stabilizing the screw set in said bore.

3. Eyeglasses as defined in claim 1, wherein the fixed attachment means for each springy bar to the temple member comprises rivet means.

4. Eyeglasses as defined in claim 2, wherein the fixed attachment means for each springy bar to the temple member comprises rivet means.

* * * * *